(12) United States Patent
Allen et al.

(10) Patent No.: US 8,636,184 B2
(45) Date of Patent: Jan. 28, 2014

(54) COMPACT FOLDING BICYCLE CARRIER FOR MOTOR VEHICLES

(75) Inventors: Richard A. Allen, Concord, MA (US); Alexander R. Allen, Vero Beach, FL (US)

(73) Assignee: R.A. Allen Company, Inc.

( * ) Notice: Subject to any disclaimer, the term of this patent is extended or adjusted under 35 U.S.C. 154(b) by 426 days.

(21) Appl. No.: 12/925,225

(22) Filed: Oct. 15, 2010

(65) Prior Publication Data

US 2012/0091180 A1    Apr. 19, 2012

(51) Int. Cl.
*B60R 9/00* (2006.01)
*B60R 11/00* (2006.01)
*B60R 9/04* (2006.01)

(52) U.S. Cl.
USPC ........... 224/497; 224/521; 224/523; 224/532; 224/314

(58) Field of Classification Search
USPC .................. 224/497, 521, 523, 532, 314, 924
See application file for complete search history.

(56) References Cited

U.S. PATENT DOCUMENTS

| | | | | |
|---|---|---|---|---|
| 3,710,999 A * | 1/1973 | Allen | | 224/500 |
| 3,927,811 A * | 12/1975 | Nussbaum | | 224/497 |
| 4,369,902 A * | 1/1983 | Lampeas | | 224/496 |
| 4,518,108 A * | 5/1985 | Allen | | 224/314 |
| 4,709,840 A * | 12/1987 | Allen | | 224/314 |
| 4,830,250 A * | 5/1989 | Newbold et al. | | 224/314 |
| 5,056,699 A * | 10/1991 | Newbold et al. | | 224/314 |
| 5,169,042 A * | 12/1992 | Ching | | 224/535 |
| 5,558,261 A * | 9/1996 | Hedeen | | 224/511 |
| 5,826,767 A * | 10/1998 | Chimenti et al. | | 224/324 |
| 5,836,492 A * | 11/1998 | Allen et al. | | 224/493 |
| 6,286,738 B1 * | 9/2001 | Robins et al. | | 224/314 |
| 6,345,748 B1 * | 2/2002 | Chimenti et al. | | 224/324 |
| 6,502,729 B2 * | 1/2003 | Ferman | | 224/497 |
| 7,434,714 B2 * | 10/2008 | Huang | | 224/497 |
| 7,857,179 B1 * | 12/2010 | Allen et al. | | 224/504 |
| 8,109,422 B2 * | 2/2012 | Murray | | 224/314 |
| 8,220,678 B2 * | 7/2012 | Bove et al. | | 224/324 |
| 2002/0038810 A1 * | 4/2002 | Robins et al. | | 224/532 |

* cited by examiner

*Primary Examiner* — Nathan J Newhouse
*Assistant Examiner* — Lester L Vanterpool
(74) *Attorney, Agent, or Firm* — Herbert L. Bello

(57) ABSTRACT

A compact folding bicycle carrier has a frame, a folding lower foot member and a pair of folding articulated upper carrying members. The lower foot member is pivotally mounted to a lower end of the frame and constrained for limited movement relative thereto. Each articulated carrying member has a supporting arm and a carrying arm. One end of each supporting arm is pivotally mounted to an upper end of the frame at opposite sides thereof. Each carrying arm is associated with one supporting arm. Each carrying arm has a cradle for holding a bicycle adjacent one end and an upper foot at the other end. Each carrying arm, between the cradle and the upper foot, is pivotally mounted to its respective supporting arm. The supporting arms are constrained for limited movement relative to the frame and each carrying arm is constrained for limited movement relative to its respective supporting arm.

14 Claims, 7 Drawing Sheets

COMPACT FOLDING BICYCLE CARRIER FOR MOTOR VEHICLES

BACKGROUND OF THE INVENTION

1. Field of Invention

The present invention relates to bicycle carriers that are configured to be mounted on motor vehicles, and more particularly, is directed toward a compact folding bicycle carrier of the foregoing type which can be folded into a relatively small configuration that can be easily carried and placed into a package that requires relatively little retail shelf space.

2. Description of the Prior Art

In recent years, the popularity of bicycle riding for sport, recreation and transportation has increased. Folding bicycle carriers of various configurations have been designed which enable the bicycle owner to transport one or more bicycles from place to place by means of his/her motor vehicle. Folding bicycle carriers have upper and lower feet that are configured to rest on the motor vehicle and extending carrying arms for carrying one or more bicycles. Although prior art folding carriers can be folded into a relatively flat package, they suffer from the disadvantage and limitation that the overall configuration of the folded carrier is bulky and cumbersome to carry. Also, each packaged prior art folding carrier requires a significant amount of retail shelf space. Prior art folding bicycle carriers are shown in U.S. Pat. Nos. 3,927,811; 4,518,108; 4,709,840; 4,830,250; 5,056,699; 5,826,767; 6,286,738 and 6,345,748. A need has arisen for a folding carrier of the foregoing type which can be folded into a relatively small configuration that can be easily carried in a sport bag and placed into a package that requires relatively little retail shelf space.

SUMMARY OF THE INVENTION

It is an object of the present invention to provide a folding carrier that can be folded into a relatively small configuration that can be easily carried and placed into a package that requires relatively little retail shelf space. The folding carrier embodying the present invention includes a substantially T-shaped frame, a folding lower foot member and a pair of folding articulated carrying members. The T-shaped frame has a bracket at an upper end and an elongated body depending from the bracket. The lower foot member is pivotally mounted to a lower end of the elongated body and constrained for limited movement relative thereto. Each articulated carrying member has a supporting arm and a carrying arm, the supporting arm and carrying member being pivotally movable toward and away from each other. One end of each supporting arm is pivotally mounted to the bracket at the upper end of the frame at opposite sides thereof. Each carrying arm is associated with one supporting arm. Each carrying arm has a cradle or bicycle holding member adjacent one end and an upper foot at the other end. Each carrying arm, between the cradle and the upper foot, is pivotally mounted to its respective supporting arm. The supporting arms are constrained for limited movement relative to the bracket and each carrying arm is constrained for limited movement relative to its respective supporting arm. The lower foot member is in substantially parallel relationship with the elongated body when in its closed position. The lower foot member is pivoted away from the elongated body when in its operational position. The supporting arm and carrying member of each articulated carrying member are pivotally movable in substantially perpendicular planes relative to one another. Each articulated carrying member is in substantially parallel relationship with the frame when in its folded position. When the lower foot member is in its operational position and the carrying member is in its extended position, the supporting member is pivoted away from the elongated body, the lower foot member and the upper feet are positioned to rest on a motor vehicle and the cradle is positioned to carry a bicycle placed thereon.

Other objects of the present invention will in part be obvious and will in part appear hereinafter.

The invention accordingly comprises the apparatuses and systems, together with their parts, elements and interrelationships that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
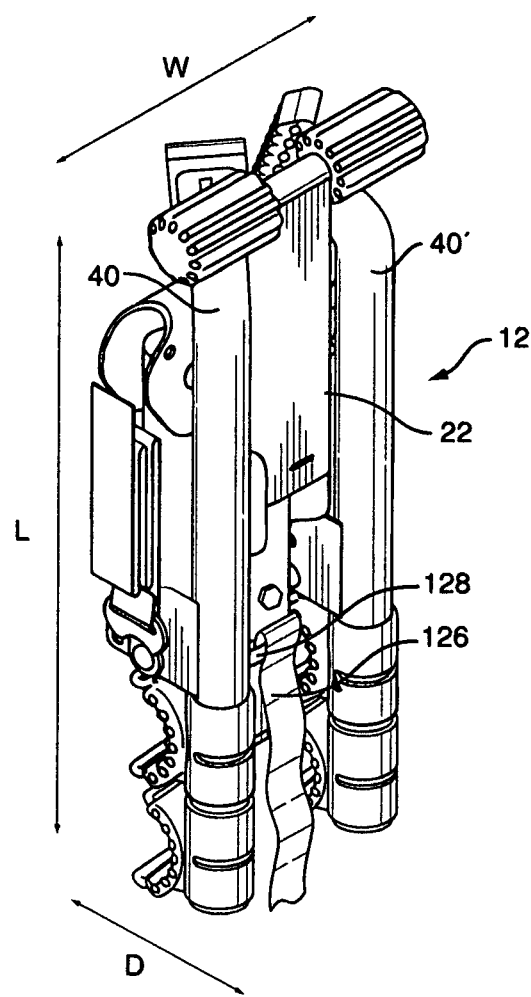
FIG. 1 is a perspective view of a compact folding carrier made in accordance with the invention, the folding carrier being shown In its compact configuration.
Figure 2:
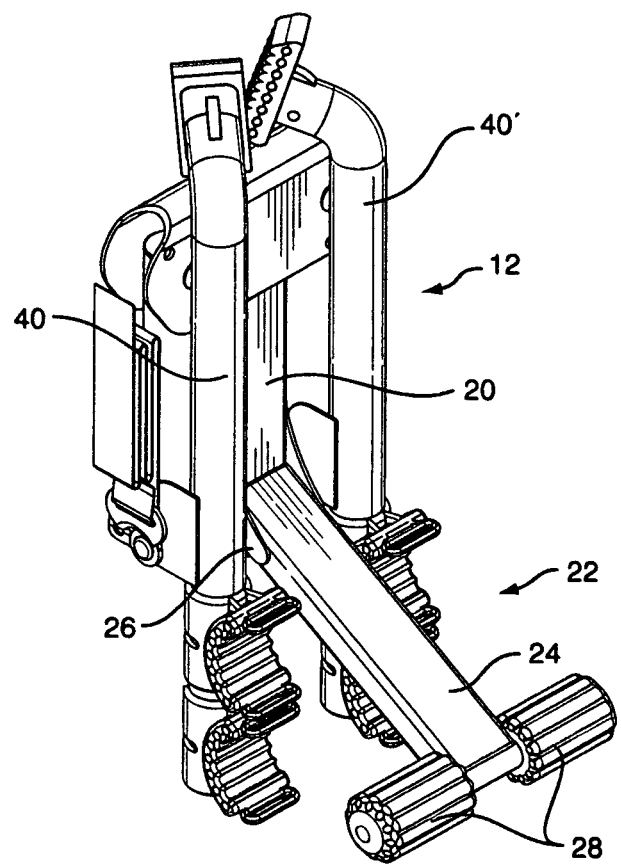
FIG. 2 is a perspective view of the compact folding carrier of FIG. 1 with the bottom foot member moved to its extended position.
Figure 3:
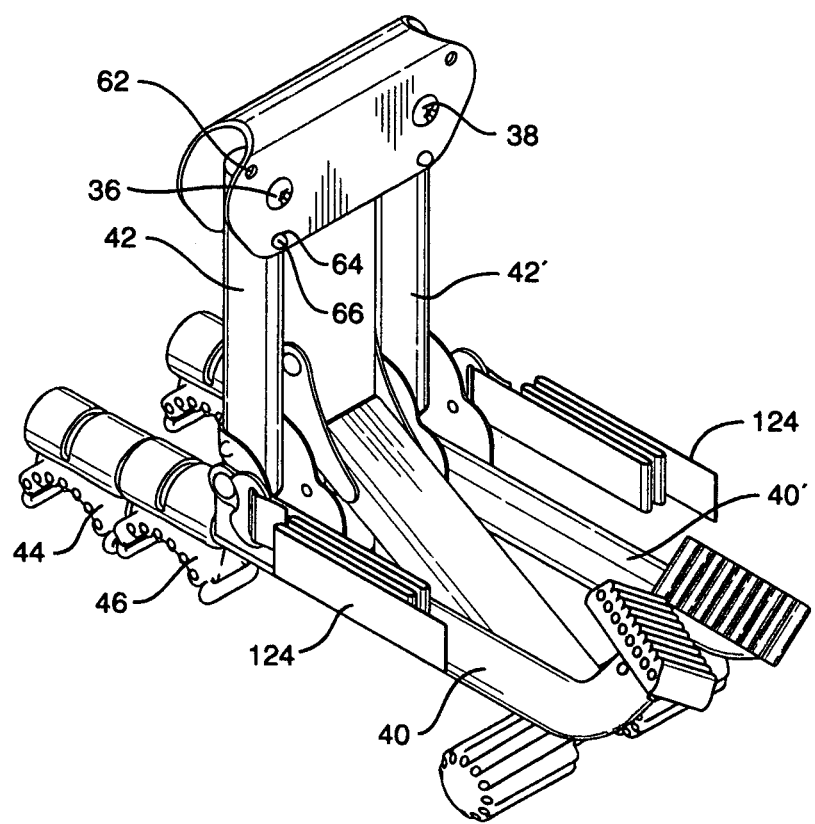
FIG. 3 is a perspective view of the compact folding carrier of FIG. 2 with the carrying arm pivotally moved relative to the supporting arm.
Figure 4:
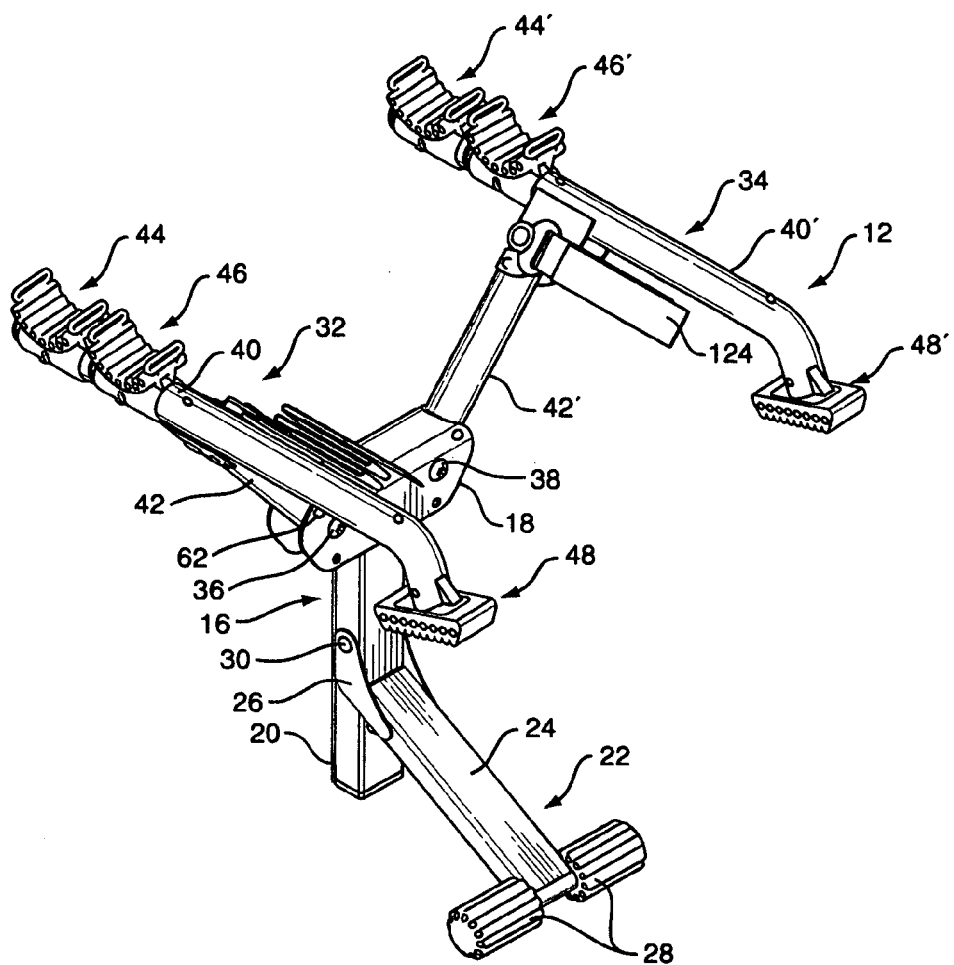
FIG. 4 is a perspective view of the compact folding carrier of FIG. 3 with the supporting arm pivotally moved outwardly relative to the frame, the compact folding carrier being in its operational position.
Figure 5:
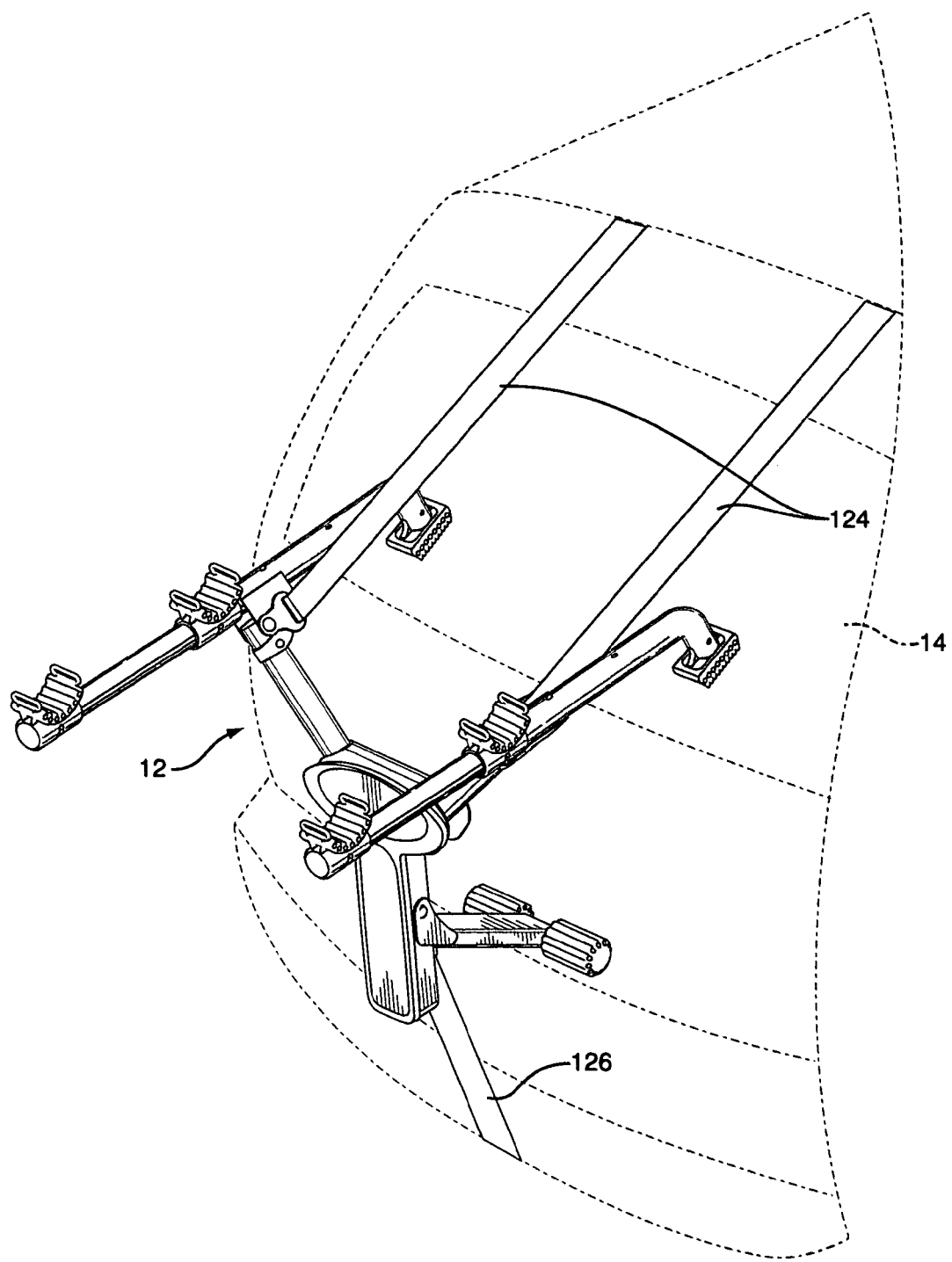
FIG. 5 is a perspective view of the compact folding carrier of FIG. 5 mounted on a motor vehicle.

Referring now to the drawings, particularly FIGS. 1-4, there is shown a compact folding bicycle carrier 12 embodying the present invention for carrying one or two bicycles. In FIG. 1, compact folding carrier 12 is in a folded or storage configuration. FIGS. 2-4 show the steps of unfolding compact folding carrier 12 from its folded configuration to its unfolded or operational configuration. In FIG. 5, compact folding carrier 12 is mounted on a motor vehicle 14.

As best shown in FIG. 4, compact folding carrier 12 includes a substantially T-shaped frame 16 with a bracket 18 at an upper end and an elongated body 20. Bracket 18 and elongated body 20 are connected to one another in a substantially perpendicular relationship. In the illustrated embodiment, by way of example, bracket 18 is a substantially U-shaped bracket and elongated body 20 is an elongated rectangular body, the bracket and elongated body being welded together. A lower foot member 22 has an elongated body 24, a U-shaped bracket 26 at one end and a pair of feet 28 at an opposite end. U-shaped bracket 26 is pivotally mounted to elongated body 20 by a fastener 30, for example a bolt and lock nut. U-shaped bracket 26 is constrained for limited movement relative to elongated body 20. Lower foot member 22 is movable between a folded or closed position shown in FIG. 1 and an opened or operational position shown in FIG. 2. Lower foot member 22 is in substantially parallel relationship with elongated body 20 when in its closed position, Lower foot member 22 is pivoted away from elongated body 20 when in its operational position, U-shaped bracket 26 resting against elongated body 20. In the illustrated embodiment, feet 28 are cylindrically shaped members that are composed of a thermoplastic elastomer, for example.

As best shown in FIG. 4, a pair of articulated carrying members 32 and 34 are pivotally mounted to bracket 18 by means of fasteners 36 and 38, respectively. In the illustrated embodiment by way of example, each fastener 36 and 38 is a bolt and lock nut. Each articulated carrying member 32 and 34 is movable between a folded or closed position shown in FIG. 2 and an opened or extended position shown in FIG. 4. Articulated carrying member 32 includes a telescopic carrying arm 40 and a supporting arm 42.

Figure 7:
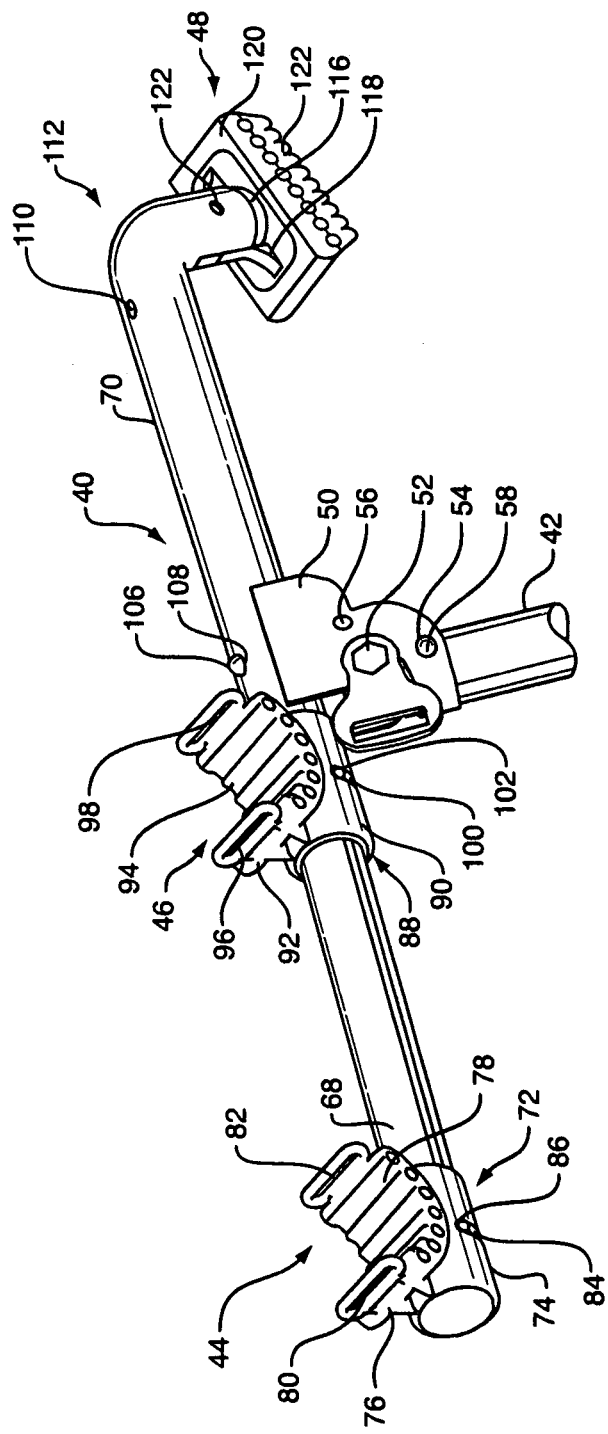
FIG. 7 is a perspective view, somewhat enlarged, of one carrying arm.

Referring now to FIG. 7, it will be seen that carrying arm 40 has cradles 44 and 46 at one end, an upper foot 48 at its other end and a bracket 50 adjacent cradle 46. As hereinafter described, each cradle 44 and 46 are configured to support one bicycle. Carrying arm 40 is pivotally mounted to supporting arm 42 for movement between an opened position shown in FIG. 3 and a closed position shown in FIG. 2 by means of bracket 50 using a fastener 52, for example, a bolt and lock nut. Bracket 50 includes round openings 54 and 56 that are sized and shaped to receive a spring-loaded push button locking member 58. Push button locking member 58 is received in hole 54 when carrying arm 40 is locked in its opened position. Carrying arm 40 is moved to it closed position by first pushing on push button locking member 58 until it is disengaged from hole 54. Next, carrying arm 40 is rotated until push button locking member 58 is received in hole 56, locking carrying arm 40 in its closed position. Since articulated carrying members 32 and 34 are substantially similar in construction and operation, corresponding components will be identified by like reference characters and distinguished by a primed notation.

Supporting arm 42 is pivotally mounted to one side of bracket 18 by means of fastener 36. Supporting arm 42 is movable between a closed position shown in FIG. 3 and an opened position shown in FIG. 4. As best shown in FIG. 3, bracket 18 includes round openings 62 and 64 which are sized and shaped to receive a spring-loaded push button locking member 66. Push button locking member 66 is received in hole 64 when supporting arm 42 is locked in its closed position. Supporting arm 42 is moved to it opened position by first pushing on push button locking member 66 until it is disengaged from hole 64. Next, supporting arm 42 is rotated upwardly until push button locking member 66 is received in hole 62, locking supporting arm 42 in its opened position shown in FIG. 4. A supporting arm 42' is pivotally mounted to the other side of bracket 18 by means of fastener 38.

From the foregoing description, it is to be noted that supporting arms 42 is pivotally movable in a first plane as it moves between its opened position and its closed position, and carrying arm 40 is pivotally movable in a second plane as it moves between its opened position and its closed position, the first plane being disposed in substantial perpendicular relationship to the second plane Referring now to FIG. 7, telescopic carrying arm 40 is shown in its extended position in which a slidable telescopic tubular member 68 is pulled outwardly from a fixed main tubular member 70. Cradle 44 is moved away from cradle 46 for carrying two bicycles, one bicycle on cradles 44 and 44' and another bicycle on cradles 46 and 46'. Cradle 44 includes a carriage 72 having a cylindrical sleeve 74 and carrying member 76. A pad 78 is fitted into carrying member 76. In the illustrated embodiment, by way of example, pad 78 is composed of a thermoplastic elastomer. Although not shown, a strap, for example, the strap shown in U.S. Pat. No. 5,435,472, is threaded through slotted openings 80 and 82 in carrying member 76 for securing a bicycle resting on pad 78. An arcuate slot 84 is formed in cylindrical sleeve 74, the arcuate slot extending from one side of the sleeve to the other side of the sleeve below carrying member 76. A holder 86, for example a screw, that is centered in slot 84 is turned into tubular member 68. Holder 86 is sized and shaped to allow limited rotation of cradle 44 on tubular member 68 and prevent longitudinal sliding movement of cradle 44 on tubular member 68.

Cradle 46 includes a carriage 88 having a cylindrical sleeve 90 and carrying member 92. A pad 94 is fitted into carrying member 92. In the illustrated embodiment, by way of example, pad 94 is composed of a thermoplastic elastomer. Although not shown, straps are threaded through slotted openings 96 and 98 in carrying member 92 for securing a bicycle resting on pad 94. An arcuate slot 100 is formed in cylindrical sleeve 90, the arcuate slot extending from one side of the sleeve to the other side of the sleeve below carrying member 92. A holder 102, for example a screw, that is centered in slot 100 is turned into tubular member 70 and extends into an elongated longitudinal slot 104 formed in telescopic tubular member 68. Holder 102 is sized and shaped to allow limited rotation of cradle 46 on tubular member 70 and prevent longitudinal sliding movement of cradle 46 on tubular member 70. In addition, since holder 102 extends into elongated longitudinal slot 104, telescopic tubular member 68 is prevented from rotational movement relative to tubular member 70. Telescopic tubular member 68 is held in its extended and retracted position by means of a spring-loaded button locking member 106 which is received in openings 108 and 110, respectively. Telescopic tubular member 68 is moved from its extended position to its retracted position by first pushing on push button locking member 106 until it is disengaged from hole 108. Next, telescopic tubular member 68 is pushed into main tubular member 70 until push button locking member 106 is received in hole 110, locking telescopic tubular member 68 in its retracted position shown in FIG. 4. Telescopic tubular member 68 is moved from its retracted position to its extended position by first pushing on push button locking member 106 until it is disengaged from hole 110. Next, telescopic tubular member 68 is pulled away from tubular member 70 until push button locking member 106 is received in hole 108, locking telescopic tubular member 68 in its extended position shown in FIG. 7.

As best shown in FIG. 7, tubular member 70 is formed with a bend 112 adjacent its free end and opposing elongated slots 114 at its free end. In the illustrated embodiment, upper foot 48 is formed with an upper body 116 having opposing wings 118 and a lower body 120. Upper body 116 is received within tubular member 70 and pivotally mounted therein by means of a pivot pin 122, opposing wings 118 being received in elongated slots 114. The mounting of upper foot 48 in tubular member 70 permits limited pivoting movement of the upper foot relative to tubular member 70 for securely seating carrier 12 on motor vehicle 14. In the illustrated embodiment, upper foot 48 is a composite thermoplastic elastomer having different durometer hardness readings. For example, upper body 116, opposing wings 118 and an upper portion of lower body 120 has a durometer hardness reading in the range of 85 to 90. The lower portion or outer surface of lower body 120 that rests on motor vehicle 14 when carrier 12 is mounted thereon has a durometer hardness reading in the range of 65 to 70.

As previously indicated, the unfolding of compact folding carrier 12 from its folded or storage configuration to its opened operation configuration is shown in FIGS. 1-4. The folded or storage configuration of carrier 12 is shown in FIG. 1. First, lower foot member 24 is rotated downwardly to its opened position shown in FIG. 2. Next, as shown in FIG. 3, carrying arms 40 and 40' are unlocked and rotated clockwise. Then, supporting arms 42 and 42' are pivoted upwardly as shown in FIG. 4. Finally, telescopic arms 40 and 40' are unlocked and extended to accommodate two bicycles. If only one bicycle is to be carried, it is not necessary to extend telescopic arms 40 and 40'. Compact folding carrier 12 is moved to its folded or storage position in the reverse order. Typically, the height "H", the width "W" and the depth "D" dimensions of carrier 12 shown in FIG. 1, in its folded configuration, are about sixteen and one half inches in height, six inches in width and four inches in depth. Accordingly, compact folding carrier 12, when in its folded or closed configuration shown in FIG. 1, is sized and shaped to fit into a relatively small package that is no larger than seventeen inches high, seven inches wide and five inches deep.

FIG. 5 shows compact folding carrier 12 mounted on motor vehicle 14. One end of upper straps 124 and one end of a lower strap 126 are secured to motor vehicle 14. In the illustrated embodiment, the other end of upper straps 126 are secure to carrier 12 using fasteners 36 and 38, and the other end of lower strap 126 is secured to a loop 128 that is attached or welded to the back side of elongated body 20.

Figure 6:
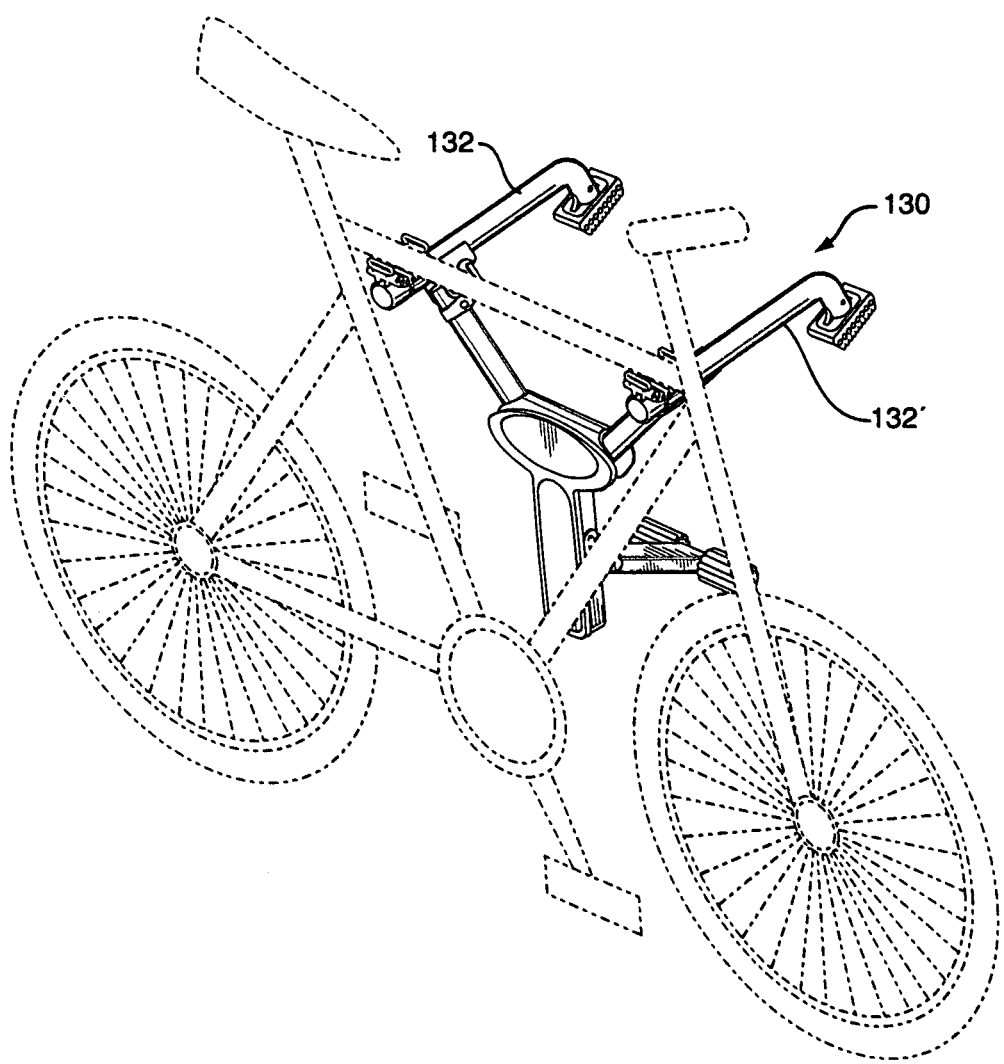
FIG. 6 is a perspective view of an alternate embodiment of the invention for carrying one bicycle mounted on a motor vehicle.

Referring now to FIG. 6, there is shown an alternate embodiment of the invention in the form of a compact folding bicycle carrier 130 for carrying one bicycle. In the alternate embodiment of FIG. 6, telescopic carrying arms 40 and 40' are replaced with fixed or non-telescopic carrying arms 132 and 132'. The other components of compact folding bicycle carrier 130 are similar in construction and operation of compact folding carrier 12. In the alternate embodiment shown in FIG. 6, the typical dimensions of carrier 130 in its folded configuration are about fourteen inches in height, six inches in width and four inches in depth.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A compact folding bicycle carrier for motor vehicles, said carrier comprising:
   a) a substantially T-shaped frame with a bracket at an upper end and an elongated body depending from said bracket, said bracket and elongated body being in substantially perpendicular relationship;
   b) a lower foot member pivotally mounted to said frame, said lower foot member movable between a folded or closed position and an opened or operational position, said lower foot member being in substantially parallel relationship with said frame when in said closed position, said lower foot member being pivoted away from said frame when in said operational position; and
   a pair of articulated carrying members pivotally mounted to said frame, each said carrying member being movable between a folded or closed inoperable position and an opened or extended operable position; whereby said bicycle carrier may be folded when said members are in their inoperable, closed position to form a compact package;
   d) each said articulated carrying member includes a supporting arm and a carrying arm, one of each said carrying arms associated with one of each said supporting arms, each said carrying arm pivotally mounted at a distal end of its respective supporting arm and constrained for pivotal movement from a substantially parallel relationship with its respective supporting arm to a substantially perpendicular relationship with its respective supporting arm, each said supporting arm pivotally mounted at opposite ends of said bracket of said T-shaped frame for movement between opened and closed positions, said supporting arms are in said closed position when in substantially parallel relationship with said elongated body, said supporting arms forming a substantially Y-shape with said T-shaped frame when in their opened positions.

2. The compact folding bicycle carrier of claim 1, wherein each said carrying arm has an upper foot at one end, the other end of said carrying arm configured to carry a bicycle.

3. The compact folding bicycle carrier as claimed in claim 2 wherein each said carrying arm is a telescopic carrying arm.

4. The compact folding bicycle carrier as claimed in claim 3 wherein each said telescopic carrying arm includes a slidable telescopic tubular member and a fixed main tubular member, said slidable telescopic tubular member slidably received in fixed main tubular member.

5. The compact folding bicycle carrier as claimed in claim 4 wherein a cradle mounted on each said slidable telescopic tubular member and each said fixed main tubular member.

6. The compact folding bicycle carrier as claimed in claim 1, wherein each said upper foot is composed of a composite material having different durometer harness.

7. The compact folding bicycle carrier as claimed in claim 6 wherein said durometer hardness of an outer layer of said upper foot that is in contact with the motor vehicle when the carrier is mounted on the motor vehicle is lower than the durometer hardness of the remainder of said upper foot.

8. A compact folding bicycle carrier for carrying at least one bicycle on a motor vehicles, said carrier comprising:
   a) a substantially T-shaped frame with a bracket at an upper end and an elongated body depending from said bracket, said bracket and elongated body in substantially perpendicular relationship;
   b) a lower foot member pivotally mounted to said elongated body, said lower foot member constrained for limited movement relative to said elongated body and movable between a folded or closed position and an opened or operational position, said lower foot member in substantially parallel relationship with said elongated body when in said closed position, said lower foot member pivoted away from said elongated body when in said operational position;
   (c) a pair of articulated carrying members pivotally mounted to said bracket, each said articulated carrying member movable between a folded or closed position and an opened or extended position,
   (d) each said articulated carrying member includes a supporting arm and a carrying arm, one of each said supporting arm associated with one of said carrying arms, each said carrying arm has at least one cradle at one end for supporting a bicycle place thereon and an upper foot at its other end, one end of each said supporting arm is pivotally mounted to one side of said bracket for movement between opened and folded positions, each said carrying arm, at a position which is between said cradle and said upper foot, is pivotally mounted to an opposite end of its respective supporting arm for movement between opened and folded positions, each said supporting arm is pivotally movable in a first plane, each said carrying arm pivotally is movable in a second plane, said first plane being disposed in substantial perpendicular relationship to said second plane;

(e) said carrying arm and supporting arm of each said articulated carrying member in substantially parallel relationship with said elongated body when said articulated carrying member is in its folded position;

(f) when said lower foot member is in its operational position and said carrying member is in its extended position, said lower foot member and said upper feet are positioned to rest on a motor vehicle and said carrying arm is positioned to carry a bicycle placed thereon.

9. The compact folding bicycle carrier as claimed in claim 8 including locking means operative associated with each said articulated carrying member for locking each said carrying arm and each said supporting arm in its opened position.

10. The compact folding bicycle carrier as claimed in claim 8 wherein the height, the width and the depth dimensions of the compact folding carrier when in its folded configuration are no greater than sixteen and one half inches in height, six inches in width and four inches in depth.

11. The compact folding bicycle carrier as claimed in claim 8 wherein each said carrying arm is a telescopic carrying arm that is movable between a retracted position and an extended position.

12. The compact folding bicycle carrier as claimed in claim 11 wherein there are at least two cradles mounted on each said carrying arm and each said telescopic carrying arm includes a slidable telescopic tubular member and a fixed main tubular member, said slidable telescopic tubular member slidably received in said fixed main tubular member, one of said cradles mounted on each said slidable tubular member and one of said cradles is mounted on each said fixed main tubular member.

13. The compact folding bicycle carrier as claimed in claim 8 wherein each said upper foot is pivotally mounted to each said carrying arm.

14. The compact folding bicycle carrier as claimed in claim 12 wherein each said upper foot is composed of a composite material having a different durometer hardness, said durometer hardness of an outer layer of said upper foot that is in contact with the motor vehicle when the carrier is mounted on the motor vehicle is lower than the durometer hardness of the remainder of said upper foot.

\* \* \* \* \*